3,176,013
17α-(ALIPHATIC HYDROCARBON) - 4,5 - EPOXY-19-NORANDROSTANE - 3β,17β - DIOLS AND LOWER ALKANOATES THEREOF
Paul D. Klimstra, Northbrook, Ill., assignor to G. D. Searle & Co., Chicago, Ill., a corporation of Delaware
No Drawing.   Filed July 25, 1963, Ser. No. 297,683
15 Claims.   (Cl. 260—239.55)

This invention is concerned with 4,5-epoxy-19-norsteroids and, more particularly, with 17α-(aliphatic hydrocarbon)-4,5-epoxy-19-norandrostane-3β,17β-diols and the corresponding lower alkanoyl esters. The compounds specifically contemplated can be represented by the structural formula

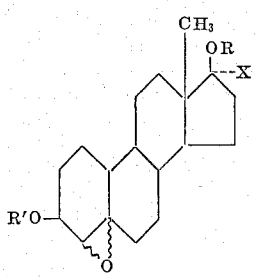

wherein X represents a lower aliphatic hydrocarbon radical, R and R' can be hydrogen or a lower alkanoyl radical, and the wavy lines are indicative of the alternative α and β configurations of the 4,5-epoxy group.

The lower aliphatic hydrocarbon radicals designated by X in the foregoing representation are exemplified by methyl, ethyl, isopropyl, secondary-butyl, tertiary-butyl, pentyl, hexyl, heptyl, vinyl, propenyl, allyl, crotyl, butenyl, pentenyl, hexenyl, heptenyl, ethynyl, propynyl, propargyl, butynyl, pentynyl, hexynyl, and heptynyl, i.e., those groups containing less than 8 carbon atoms. The lower alkanoyl radicals symbolized by R and R' include acetyl, propionyl, butyryl, valeryl, caproyl, heptanoyl, and the corresponding branched-chain groups isomeric therewith.

The compounds of the present invention can be manufactured by epoxidation of the corresponding 17α-(lower aliphatic hydrocarbon)-19-norandrost-4-ene-3β,17β-diols and the corresponding lower alkanoate esters represented by the structural formula

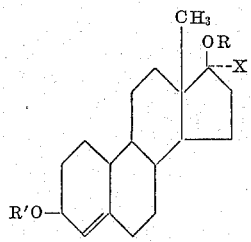

wherein X, R, and R' are as defined hereinbefore. That process may be conducted with a variety of reagents, for example, perbenzoic acid, m-chlorobenzoic acid, peracetic acid, and monoperphthalic acid. An inert non-polar organic solvent such as carbon tetrachloride, benzene, or toluene is the preferred reaction medium, and the process may be carried out conveniently at or near room temperature. When the starting material contains a 3-hydroxy group, the instant 4β,5β-epoxy derivatives are produced while utilization of the 3-(lower alkanoyl)oxy starting materials results in the instant 4α,5α-epoxy compounds. Specific illustrations of the process in question are the reaction of 17α-ethynyl-19-norandrost-4-ene-3β, 17β-diol and 17α-ethynyl-19-norandrost - 4 - ene - 3β,17β-diol 3,17-diacetate with a benzene solution of perbenzoic acid to afford 4β,5β-epoxy-17α-ethynyl-19-norandrostane-3β,17β-diol and 4α,5α-epoxy-17α-ethynyl - 19 - norandrostane-3β,17β-diol 3,17-diacetate, respectively.

Partial catalytic hydrogenation of the instant 17α-(lower alkynyl) compounds provides an alternate method for the preparation of the 17α-(lower alkenyl) substances of the present invention. As a specific example, the aforementioned 4β,5β-epoxy-17α-ethynyl - 19 - norandrostane-3β,17β-diol in pyridine is shaken with 5% palladium-on-carbon catalysts to yield 4β,5β-epoxy-17α-vinyl-19-norandrostane-3β,17β-diol.

Complete saturation of the acetylenic linkage of the aforementioned 17α-(lower alkynyl) derivatives by catalytic reduction results in the instant 17α-(lower alkyl) substances wherein the alkyl group contains more than one carbon atom. Typically, the hydrogenation of 4α,-5α-epoxy-17α-ethynyl-19-norandrostane-3β,17β-diol 3,17-diacetate in ethanol with a suitable catalyst such as 5% palladium-on-carbon results in 4α,5α-epoxy-17α-ethyl-19-norandrostane-3β,17β-diol 3,17-diacetate.

The 3-hydroxy-4α,5α-epoxy compounds encompassed by the present invention are conveniently obtained by hydrolysis of the corresponding 3-(lower alkanoates). Thus, alkaline saponification of 4α,5α-epoxy-17α-ethynyl-19-norandrostane-3β,17β - diol 3,17 - diacetate or 4α,5α-epoxy-17α-ethynyl-19-norandrostane-3β,17β - diol 3 - acetate yields 4α,5α-epoxy-17α-ethynyl - 19 - norandrostane-3β,17β-diol 17-acetate and 4α,5α-epoxy-17α-ethynyl-19-norandrostane-3β,17β-diol, respectively.

Esterification of the instant 4β,5β-epoxy - 3 - hydroxy compounds with a suitable acylating agent such as a lower alkanoic acid anhydride or halide in the presence of a suitable alkaline catalyst such as pyridine or triethylamine affords the corresponding 4β,5β-epoxy - 3 - (lower alkanoyl)oxy derivatives. The reaction of 4β,5β-epoxy-17α-ethynyl-19-norandrostane-3β,17β - diol or 4β,5β - epoxy-17α-ethynyl-19-norandrostane-3β,17β-diol 17-acetate, for example, with acetic anhydride in pyridine affords 4β,5β-epoxy-17α-ethynyl-19-norandrostane-3β,17β-diol 3-acetate and 4β,5β-epoxy-17α-ethynyl-19-norandrostane - 3β,17β-diol 3,17-diacetate, respectively.

The compounds of this invention are characterized by valuable pharmacological properties. They possess hormonal activity, for example, as is exemplified by their ability to evoke a uterine deciduogenic response. In addition, they display androgenic, anabolic, and anti-estrogenic activity.

The following examples illustrate in further detail some of the compounds which constitute this invention and methods for their preparation. However, this invention is not to be construed as limited thereby either in spirit or in scope as numerous modifications in materials and methods can be adopted without departing from the invention herein described. In these examples, temperatures are indicated in degrees centigrade (° C.) and quantities of materials in parts by weight unless otherwise noted.

*Example 1*

To a mixture of 3.4 parts of lithium aluminum hydride and 111 parts of tetrahydrofuran, in a nitrogen atmosphere, is added, with stirring and cooling by means of an ice bath, a solution of 20 parts of tertiary-butyl alcohol in 22 parts of tetrahydrofuran over a period of about 45 minutes. To the resulting mixture is then added a solution of 10 parts of 17β-acetoxy-17α-ethynyl-19-norandrost-4-en-3-one in 133 parts of tetrahydrofuran. This reaction mixture is stirred at room temperature for about 3 hours, then is poured into 3000 parts of a mixture of ice and water containing 105 parts of acetic acid. The precipitate which forms is collected by filtration, washed successively on the filter with water, 5% aqueous sodium bicarbonate, and water, then is dried in air. The resulting crude product is recrystallized from aqueous methanol to yield 17α-ethynyl-19-norandrost-4-ene-3β,17β-diol 17-acetate, which melts at about 181–182.5°.

*Example 2*

The substitution of 10.4 parts of 17α-ethynyl-17β-propionoxy-19-norandrost-4-en-3-one in the procedure described in Example 1 results in 17α-ethynyl-19-norandrost-4-ene-3β,17β-diol 17-propionate.

*Example 3*

A mixture of 30 parts of 17α-ethynyl-19-norandrost-4-ene-3β,17β-diol, 360 parts of dry pyridine, and 111 parts of acetic anhydride, under nitrogen, is stirred and heated at the reflux temperature for about 5 hours. This reaction mixture is cooled, then poured into approximately 3500 parts of cold water, and the resulting aqueous mixture is stirred at room temperature for about ½ hour. The precipitate which forms is collected by filtration, then is washed on the filter with water and dried in air. This solid material is extracted into ether, and the ether solution is washed successively with 10% aqueous hydrochloric acid and 5% aqueus sodium bicarbonate. Drying over anhydrous sodium sulfate containing decolorizing carbon followed by removal of the solvent by distillation at reduced pressure affords an oil which solidifies on standing. Recrystallization of that solid by dropwise dilution with water of a methanol solution affords 17α-ethynyl-19-norandrost-4-ene-3β,17β-diol 3,17-diacetate, melting at about 126–127°. It displays an optical rotation of —72.5° in chloroform.

*Example 4*

The acylation of 17α-ethynyl-19-norandrost-4-ene-3β,17β-diol with 141.5 parts of propionic anhydride, utilizing the processes described in Example 3, affords 17α-ethynyl-19-norandrost-4-ene 3β,17β-diol 3,17-dipropionate.

*Example 5*

A solution of 14 parts of 17α-ethynyl-19-norandrost-4-ene-3β,17β-diol and 50 parts of acetic anhydride in 140 parts of pyridine is stored at room temperature, in a nitrogen atmosphere, for about 16 hours, then is carefully poured into cold water. This aqueous mixture is stirred for about 15 minutes, then is filtered to remove the precipitate which has formed. The filter cake is washed successively with warm water, 10% aqueous hydrochloric acid, and 5% aqueous sodium bicarbonate, then is extracted into ether. The organic layer is separated, dried over anhydrous potassium carbonate containing decolorizing carbon, then stripped of solvent at reduced pressure to afford, as a white solid, 17α-ethynyl-19-norandrost-4-ene-3β,17β-diol 3-acetate, melting at about 155.5–156°. It displays an optical rotation of —69° in chloroform.

*Example 6*

When the procedure of Example 5 is conducted utilizing 63.7 parts of propionic anhydride rather than acetic anhydride, 17α-ethynyl-19-norandrost-4-ene-3β,17β-diol 3-propionate is obtained.

*Example 7*

A solution of one part of 17α-ethynyl-19-norandrost-4-ene-3β,17β-diol 3,17-diacetate in 22 parts by volume of a 0.7 N solution of perbenzoic acid in benzene is stored at about 3° for about 16 hours, then is allowed to warm to room temperature and is washed successively with dilute aqueous sodium carbonate and water. This benzene solution is then dried over anhydrous sodium sulfate, and the solvent is removed by distillation at reduced pressure. The residual oil solidifies on standing, and the resulting solid is recrystallized from aqueous methanol to afford 4α,5α-epoxy-17α-ethynyl-19-norandrostane-3β,17β-diol 3,17-diacetate, melting at about 172–175°. This substance is characterized further by an optical rotation of —38.5° in chloroform and also by the structural formula

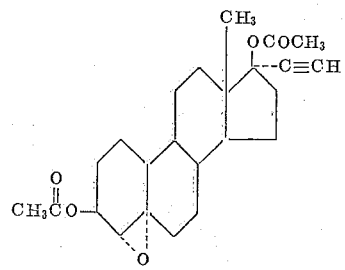

*Example 8*

To a solution of 4 parts of 4α,5α-epoxy-17α-ethynyl-19-norandrostane-3β,17β-diol 3,17-diacetate in 40 parts of methanol is added a solution of 2 parts of sodium carbonate in 20 parts of water, and this reaction mixture is heated at 50° for about 15 minutes, then is cooled and kept at 0–5° for about 16 hours. The solution is then poured into water, and the precipitate which forms is collected by filtration, washed on the filter with water, and recrystallized from aqueous methanol to afford 4α,5α-epoxy-17α-ethynyl-19-norandrostane-3β,17β-diol 17-acetate. It displays infrared absorption maxima at about 2.75, 3.1, 3.4, 5.78, and 7.92 microns and is represented by the structural formula

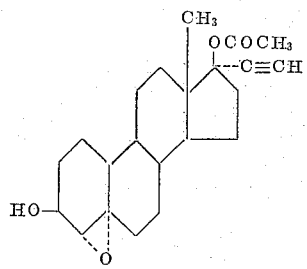

*Example 9*

A solution of 4.7 parts of 17α-ethynyl-19-norandrost-4-ene-3β,17β-diol 3-acetate in 100 parts by volume of a 1.26 N solution of perbenzoic acid in benzene is kept at room temperature for about 2 hours, then at 0–5° for about 16 hours. This reaction mixture is then washed successively with 5% aqueous sodium bicarbonate and 10% aqueous sodium carbonate until free of oxidant. Several washings with water followed by drying over anhydrous sodium sulfate and removal of the solvent by distillation at reduced pressure affords a glassy residue. This residue is recrystallized from acetone-hexane to afford white platelets of 4α,5α-epoxy-17α-ethynyl-19-norandrostane-3β,17β-diol 3-acetate, melting at about 176–178°. It is represented by the structural formula

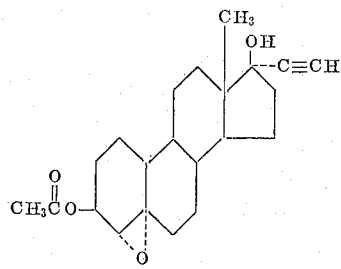

*Example 10*

To a solution of 5 parts of 4α,5α-epoxy-17α-ethynyl-19-norandrostane-3β,17β-diol 3-acetate in 120 parts of methanol is added a solution of 1.25 parts of potassium carbonate in 30 parts of water, and this reaction mixture is heated to about 50°, then allowed to stand at room temperature for about 30 minutes and finally at 0–5° for about 2 hours. The cooled solution is poured into approximately 75 parts of a mixture of ice and water, and the resulting aqueous mixture is stored at 0–5° for about 16 hours. The precipitate which forms is collected by filtration, washed on the filter with water and dried to yield 4α,5α-epoxy - 17α - ethynyl - 19 - norandrostane - 3β,17β-diol, melting at about 188–192°. This compound can be represented by the structural formula

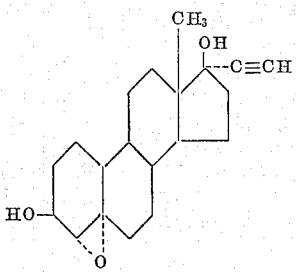

Example 11

A solution of 7 parts of 17α-ethynyl-19-norandrost-4-ene-3β,17β-diol in 130 parts by volume of a 1.1 N solution of perbenzoic acid in benzene is kept at 0–5° for about 3 hours, then is stored at room temperature for about 2 hours. This reaction mixture is washed successively with 10% aqueous sodium carbonate and water, then is dried over anhydrous sodium sulfate containing decolorizing carbon. Removal of the solvent by distillation at reduced pressure affords a foamy glass-like residue which is crystallized from aqueous methanol to afford 4β,5β-epoxy-17α-ethynyl-19-norandrostane - 3β,17β - diol hemihydrate, melting at about 142–145°. This substance is characterized further by the structural formula

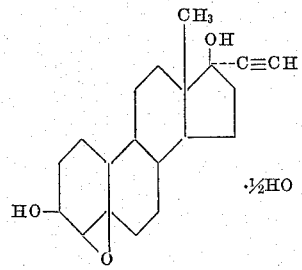

Example 12

A mixture of one part of 4β,5β-epoxy-17α-ethynyl-19-norandrostane-3β,17β-diol, 3.5 parts of acetic anhydride, and 7 parts of pyridine is stored at room temperature for about 16 hours, then is poured slowly into ice-cold water. The resulting semi-solid precipitate is separated by decantation, then is extracted into ether. The organic layer is separated and washed several times with water, then is dried over anhydrous sodium sulfate containing decolorizing carbon and is concentrated at reduced pressure to afford an oily residue. Crystallization of this residue from acetone-hexane results in pure 4β,5β-epoxy-17α-ethynyl-19-norandrostane-3β,17β-diol 3-acetate, melting at about 140–145°. It displays an optical rotation of −79° in chloroform and is characterized further by the structural formula

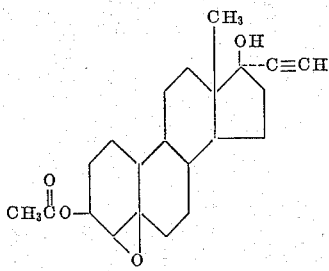

Example 13

A solution of 7.5 parts of 17α-ethynyl-19-norandrost-4-ene-3β,17β-diol 17-acetate in 150 parts by volume of a 1.1 N solution of perbenzoic acid in benzene is stored at 0–5° for about 16 hours, then is washed successively with 10% aqueous sodium carbonate and water. Drying over anhydrous sodium sulfate followed by distillation of the solvent at reduced pressure affords 4β,5β-epoxy-17α-ethynyl-19-norandrostane-3β,17β-diol 17-acetate as an oil. This compound can be represented by the structural formula

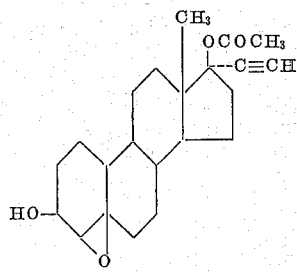

Example 14

A mixture of one part of 4β,5β-epoxy-17α-ethynyl-19-norandrostane-3β,17β-diol 17-acetate, 3.5 parts of acetic anhydride, and 7 parts of pyridine is allowed to stand at room temperature for about 16 hours, then is poured slowly into ice-cold water. The semi-solid precipitate which forms is extracted into ether, and the organic extract is washed several times with water, then is dried over anhydrous sodium sulfate containing decolorizing carbon. The solution is stripped of solvent at reduced pressure and the glass-like residue is recrystallized from aqueous methanol to afford 4β,5β-epoxy-17α-ethynl-19-norandrostane-3β,17β-diol 3,17-diacetate. This substance displays infrared absorption peaks at about 3.1, 3.4, 5.78, 7.9, and 9.8 microns. It can be represented by the structural formula

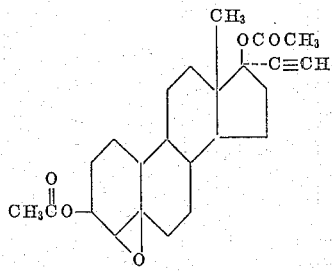

Example 15

By substituting 1.07 parts of 17α-ethynyl-19-norandrost-4-ene-3α,17α-diol 3,17-dipropionate and otherwise proceeding according to the processes described in Example 7, 4α,5α-epoxy-17α-ethynyl-19-norandrostane-3β,17β-diol 3,17-dipropionate is obtained.

Example 16

When 4.28 parts of 4α,5α-epoxy-17α-ethynyl-19-norandrostane-3β,17β-diol 3,17-dipropionate is substituted for 4α,5α-epoxy-17α-ethynyl-19-norandrostane - 3β,17β - diol 3,17-diacetate in the procedure of Example 8, 4α,5α-epoxy-17α-ethynyl-19-norandrostane-3β,17β-diol 17-propionate is produced.

Example 17

The epoxidation of 4.94 parts of 17α-ethynyl-19-norandrost-4-ene-3β,17β-diol 3-proprionate by the procedure described in Example 9 affords 4α,5α-epoxy-17α-ethynyl-19-norandrostane-3β,17β-diol 3-propionate.

Example 18

The reaction of 4.46 parts of propionic anhydride with 4β,5β-epoxy-17α-ethynyl-19-norandrostane-3β,17β-diol by the processes described in Example 12 results in 4β,5β-epoxy-17α-ethynyl-19-norandrostane-3β,17β - diol 3-propionate.

Example 19

By reacting 7.8 parts of 17α-ethynyl-19-norandrost-4-ene-3β,17β-diol 17-propionate with the perbenzoic acid according to the procedure of Example 13, 4β,5β-epoxy-17α-ethynyl-19-norandrostane-3β,17β-diol 17-propionate is obtained.

Example 20

A mixture of one part of 4β,5β-epoxy-17α-ethynyl-19-norandrostane-3β,17β-diol 17-proprionate, 4.4 parts of propionic anhydride, and 9 parts of pyridine is kept at room temperature for about 16 hours. This reaction mixture is then diluted carefully with cold water, and the resulting aqueous mixture is extracted with ether. The ether solution is washed with water until neutral, then is dried over anhydrous sodium sulfate containing decolorizing carbon. Distillation of the solvent at reduced pressure results in 4β,5β-epoxy-17α-ethynyl-19-norandrostane-3β,17β-diol 3,17-dipropionate.

Example 21

The epoxidation of 8.3 parts of 17α-(1-hexynyl)-19-norandrost-4-ene-3β,17β-diol by the processes described in Example 11 results in 4β,5β-epoxy-17α-(1-hexynyl)-19-norandrostane-3,17β-diol, represented by the structural formula

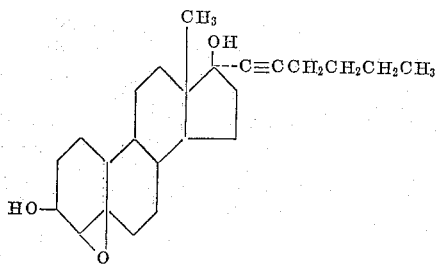

Example 22

A mixture of 35.6 parts of 17α-(1-hexynyl)-19-norandrost-4-ene-3β,17β-diol, 111 parts of acetic anhydride, and 360 parts of pyridine is stirred and heated at the reflux temperature in a nitrogen atmosphere for about 5 hours. The reaction mixture is cooled and diluted with cold water, and this aqueous mixture is then stirred at room temperature for about one hour. The resulting precipitate is separated by filtration, washed on the filter with water, and dried in air. Extraction of this solid material into ether affords a solution which is then washed successively with dilute hydrochloride acid and dilute aqueous sodium bicarbonate. The washed solution is dried over anhydrous sodium sulfate, and the solvent is removed by distillation at reduced pressure to afford 17α(1-hexynyl)-19-norandrost-4-ene-3β,17β - diol 3,17-diacetate.

The reaction of 1.15 parts of 17α-(1-hexynyl)-19-norandrost-4-ene-3β,17β-diol, 3,17-diacetate with perbenzoic acid according to the procedure disclosed in Example 7 results in 4α,5α-epoxy-17α-(1-hexynyl)-19-norandrostane-3β,17β-diol 3,17-diacetate of the structural formula

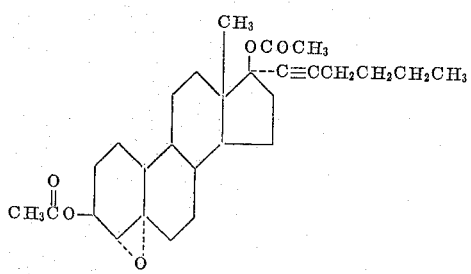

Example 23

To a solution of 4.5 parts of 4α,5α-epoxy-17α-ethynyl-19-norandrostane-3β,17β-diol 3-acetate in 350 parts of pyridine is added 0.5 part of 5% palladium-on-carbon catalyst, and this reaction mixture is stirred in a hydrogen atmosphere at room temperature and atmospheric pressure until one molecular equivalent of hydrogen is absorbed. The catalyst is removed by filtration, and the filtrate is concentrated to about ½ volume by distillation at reduced pressure, then is diluted with cold water and cooled at 0–5°. The resulting crystals are collected by filtration, dried, and recrystallized from aqueous methanol to afford 4α,5α-epoxy-17α-vinyl - 19 - norandrostane-3β,17β-diol 3-acetate, melting at about 141–142°. Infrared absorption maxima are observed at about 2.75, 3.4, 5.78, 6.02, and 7.92 microns. This compound can be represented by the structural formula

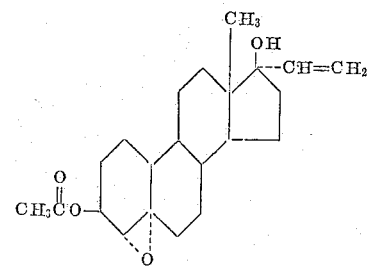

Example 24

A mixture of 5 parts of 4β,5β-epoxy-17α-ethynyl-19-norandrostane-3β,17β-diol, 0.5 part of 5% palladium-on-carbon catalyst, and 350 parts of pyridine is shaken with hydrogen at atmospheric pressure and room temperature until the absorption of one molecular equivalent of hydrogen is completed. Removal of the catalyst by filtration affords a filtrate which is partially concentrated, then diluted with water and cooled. The resulting precipitate is collected by filtration, then recrystallized from aqueous methanol, resulting in 4β,5β-epoxy-17α-vinyl-19-norandrostane-3β,17β-diol. This substance is characterized further by infrared absorption maxima at about 2.75, 3.4, and 6.02 microns and by the structural formula

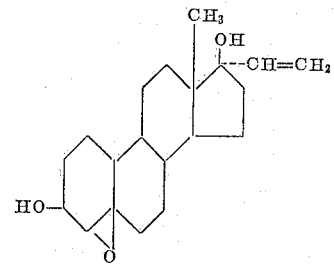

Example 25

A mixture of 5 parts of 4α,5α-epoxy-17α-ethynyl-19-norandrostane-3β,17β-diol 3-acetate, 0.5 part of 5% palladium-on-carbon catalyst, and 400 parts of ethanol is shaken with hydrogen at atmospheric pressure and room temperature until the uptake of gas ceases. The reaction mixture is filtered through diatomaceous earth, and the filtrate is stripped of solvent by distillation at reduced pressure. The residual oil is crystallized from an aqueous methanol solution to afford 4α,5α-epoxy-17α-ethyl-19-norandrostane-3β,17β-diol 3-acetate, melting at about 171–174°. It displays infrared absorption maxima at about 2.75, 3.4, 5.78, and 7.9 microns and is characterized also by the structural formula

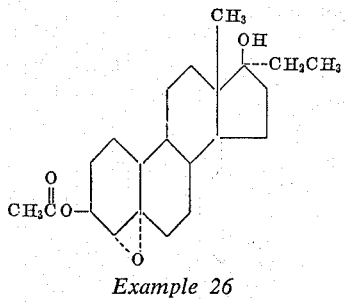

Example 26

To a solution of 5 parts of 4β,5β-epoxy-17α-ethynyl-19-norandrostane-3β,17β-diol in 400 parts of ethanol is added 0.5 part of 5% palladium-on-carbon catalyst, and this mixture is shaken with hydrogen at atmospheric pressure and room temperature until hydrogen is no longer absorbed. Removal of the catalyst by filtration through diatomaceous earth affords a solution which is concentrated under reduced pressure, resulting in a semi-solid residue. Crystallization of that residue from aqueous methanol affords 4β,5β-epoxy-17α-ethyl-19-norandrostane-3β,17β-diol, melting at about 155–158°. It is further characterized by infrared absorption maxima at about 2.75 and 3.4 microns and also by the structural formula

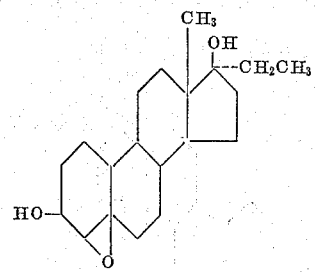

Example 27

The substitution of 4.61 parts of 17α-methyl-19-norandrost-4-ene-3β,17β-diol 3-acetate in the procedure of Example 9 results in 4α,5α-epoxy-17α-methyl-19-norandrostane-3β,17β-diol 3-acetate.

Example 28

To a solution of 5 parts of 4α,5α-epoxy-17α-methyl-19-norandrostane-3β,17β-diol 3-acetate in 120 parts of methanol is added a solution of 1.25 parts of potassium carbonate in 30 parts of water, and this reaction mixture is warmed at about 50° for a few minutes, then is cooled to room temperature and allowed to stand for about 30 minutes. Water is added, and the diluted mixture is cooled at 0–5° for about 2 hours, then diluted further with water. The resulting precipitate is collected by filtration, washed on the filter with water, and dried in air. Recrystallization from aqueous acetone, affords 4α,5α-epoxy-17α-methyl - 19 - norandrostane-3β,17β-diol, characterized by infrared absorption peaks at about 2.75 and 3.4 microns.

Example 29

The reduction of 5.7 parts of 4α,5α-epoxy-17α-(1-hexynyl)-19-norandrostane-3β,17β-diol 3,17-diacetate by the procedure described in Example 23 results in 4α,5α-epoxy-17α-(1-hexenyl)-19-norandrostane - 3β,17β - diol 3,17-diacetate.

Example 30

When 5.9 parts of 4β,5β-epoxy-17α-(1-hexynyl)-19-norandrostane-3β,17β-diol is hydrogenated by the processes described in Example 24, 4β,5β-epoxy-17α-(1-hexynyl)-19-norandrostane-3β,17β-diol is produced.

Example 31

By substituiting 6.37 parts of 4α,5α-epoxy-17α-(1-hexynyl)-19-norandrostane-3β,17β-diol, 3,17-diacetate and otherwise proceeding according to the processes described in Example 25, 4α,5α-epoxy-17α-(1-n-hexyl)-19-norandrostane-3β,17β-diol is produced.

Example 32

The substitution of 5.9 parts of 4β,5β-epoxy-17α-(1-hexynyl)-19-norandrostane-3β,17β-diol in the procedure described in Example 26 results in 4β,5β-epoxy-17α-(1-n-hexyl)-19-norandrostane-3β,17β-diol.

Example 33

The hydrogenation of 5.03 parts of 4α,5α-epoxy-17α-ethynyl-19-norandrostane-3β,17β-diol 3,17-diacetate in the procedure of Example 23 results in 4α,5α-epoxy-17α-vinyl-19-norandrostane-3β,17β-diol 3,17-diacetate.

Example 34

By substituting 5.6 parts of 4α,5α-epoxy-17α-ethylnyl-19-norandrostane-3β,17β-diol 3,17-diacetate and otherwise proceeding according to the processes described in Example 25, 4α,5α-epoxy-17α-ethyl-19-norandrostane-3β,17β-diol 3,17-diacetate is obtained.

Example 35

When 5 parts of 4α,5α-epoxy-17α-vinyl-19-norandrostane-3β,17β-diol 3-acetate is hydrolyzed according to the procedure described in Example 10, 4α,5α-epoxy-17α-vinyl-19-norandrostane-3β,17β-diol is produced.

Example 36

The hydrolysis of 5 parts of 4α,5α-epoxy-17α-ethyl-19-norandrostane-3β,17β-diol 3-acetate by the processes described in Example 10 results in 4α,5α-epoxy-17α-ethyl-19-norandrostane-3β,17β-diol.

Example 37

A solution of 5 parts of 17α-methyl-19-norandrost-4-ene-3β,17β-diol in 125 parts by volume of a 1.26 N perbenzoic acid solution in benzene is kept at about 3° for about 16 hours, then is washed successively with water and 10% aqueous sodium carbonate until the excess oxidant is removed. At this point, the organic solution is washed again with water, then is dried over anhydrous sodium sulfate and is stripped of solvent at reduced pressure. Recrystallization of the residue from aqueous acetone affords 4β,5β - epoxy - 17α - methyl - 19 - norandrostane-3β,17β-diol, which is characterized by infrared absorption peaks at about 2.75 and 3.4 microns.

Example 38

A mixture of one part of 4β,5β-epoxy-17α-methyl-19-norandrostane-3β,17β-diol, 3.5 parts of acetic anhydride and 7 parts of pyridine is allowed to stand at room temperature for about 16 hours, then is poured carefully into a mixture of ice and water. This aqueous mixture is extracted with ether, and the ether solution is washed successively with dilute hydrochloric acid and water, then is dried over anhydrous sodium sulfate and concentrated to dryness by distillation of the solvent at reduced pressure. The residue is crystallized from aqueous acetone to produce 4β,5β - epoxy - 17α - methyl - 19 - norandrostane-3β,17β-diol 3-acetate, characterized by infrared absorption maxima at about 2.75, 3.4, 5.78, and 7.92 microns.

What is claimed is:
1. A compound of the formula

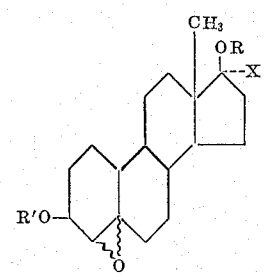

wherein X represents a lower aliphatic hydrocarbon radical, and R and R' are selected from the group consisting of hydrogen and lower alkanoyl radicals.

2. 4α,5α-epoxy-17α-vinyl-19-norandrostane-3β,17β-diol 3-acetate.
3. 4α,5α-epoxy-17α-ethyl-19-norandrostane-3β,17β-diol 3-acetate.
4. A compound of the formula

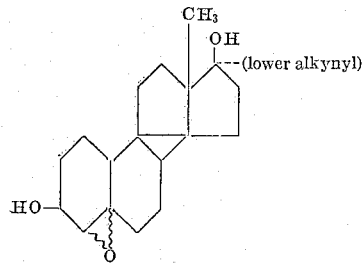

5. 4β,5β - epoxy - 17α - ethynyl - 19 - norandrostane-3β,17β - diol.
6. 4α,5α - epoxy - 17α - ethynyl - 19 - norandrostane-3β,17β - diol.
7. A compound of the formula

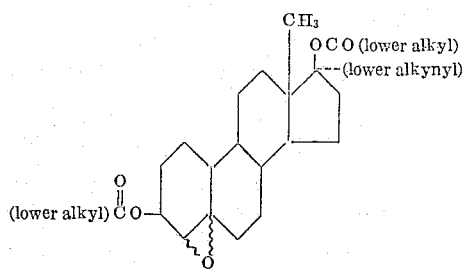

8. 4α,5α - epoxy - 17α - ethynyl - 19 - norandrostane-3β,17β-diol 3,17-diacetate.
9. A compound of the formula

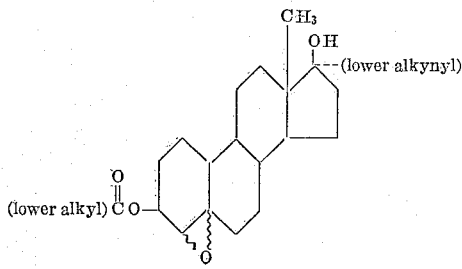

10. 4β,5β-epoxy-17α-ethynyl-19-norandrostane-3β,17β-diol 3-acetate.
11. A compound of the formula

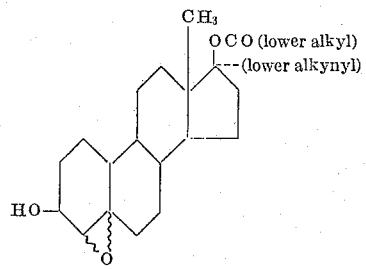

12. A compound of the formula

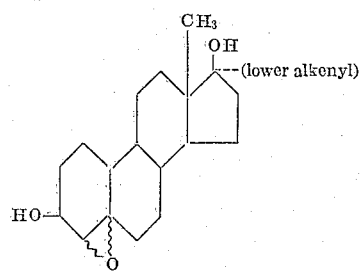

13. 4β,5β - epoxy - 17α - vinyl - 19 - norandrostane 3β,17β-diol.
14. A compound of the formula

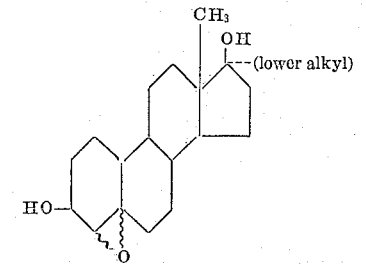

15. 4β,5β - epoxy - 17α - ethyl - 19 - norandrostane - 3β,17β-diol.

References Cited in the file of this patent
UNITED STATES PATENTS

| | | |
|---|---|---|
| 2,885,398 | Julian et al. | May 5, 1959 |
| 2,908,682 | Bible et al. | Oct. 13, 1959 |

UNITED STATES PATENT OFFICE
CERTIFICATE OF CORRECTION

Patent No. 3,176,013                                March 30, 1965

Paul D. Klimstra

It is hereby certified that error appears in the above numbered patent requiring correction and that the said Letters Patent should read as corrected below.

Column 4, line 42, for "4.7" read -- 4.75 --; column 5, lines 36 to 46, for that portion of the formula reading ·1/2HO               read               ·1/2$H_2O$ column 6, line 35, for "-ethynl-" read -- -ethynyl- --; line 54, for "-3α,17α-" read -- -3β,17β- --; column 7, line 28, for "-3,17β-" read -- -3β,17β- --; column 9, line 70, for "-(1-hexynyl)-" read -- -(1-hexenyl)- --; column 11, lines 9 to 19, for that portion of the formula reading

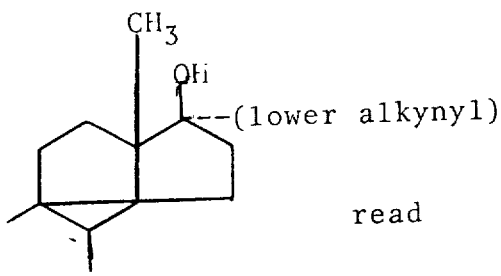      read      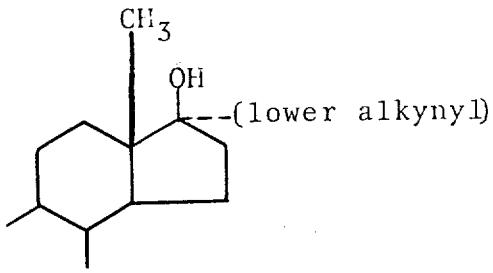

Signed and sealed this 26th day of October 1965.

(SEAL)
Attest:

ERNEST W. SWIDER                         EDWARD J. BRENNER
Attesting Officer                           Commissioner of Patents